United States Patent [19]

Ryuo et al.

[11] Patent Number: 5,227,633
[45] Date of Patent: Jul. 13, 1993

[54] JOINED SCINTILLATOR BLOCK BODY FOR RADIATION DETECTOR

[75] Inventors: Toshihiko Ryuo, Gunma; Takeo Kawanake, Hyogo, both of Japan

[73] Assignee: Shin-Etsu Chemical Co., Ltd., Tokyo, Japan

[21] Appl. No.: 849,937

[22] Filed: Mar. 12, 1992

[30] Foreign Application Priority Data

Mar. 20, 1991 [JP] Japan ................................. 3-55249

[51] Int. Cl.[5] ............................................. G01T 1/20
[52] U.S. Cl. .................................................. 250/367
[58] Field of Search ........................... 250/367, 370.11

[56] References Cited

U.S. PATENT DOCUMENTS

| | | | |
|---|---|---|---|
| 4,533,489 | 8/1985 | Utts et al. | 252/301.17 |
| 4,982,096 | 1/1991 | Fujii et al. | 250/367 |
| 5,091,650 | 2/1992 | Uchida et al. | 250/366 |

FOREIGN PATENT DOCUMENTS 1-39578  2/1989  Japan ................................. 250/367

Primary Examiner—Constantine Hannaher
Attorney, Agent, or Firm—McAulay Fisher Nissen Goldberg & Kiel

[57] ABSTRACT

The joined scintillator block body for radiation detector according to the present invention comprises a plurality of scintillator blocks, each being divided into small scintillator chips through deep grooves formed by cutting each block from the light-incident side and filled with a reflecting material and these plurality of blocks being joined together, wherein a part of the joined faces of each neighboring two blocks is joined with the reflecting material and the remaining portion thereof is joined with a transparent resin layer capable of transmitting scintillation light rays emitted by the scintillator chips. In the foregoing joined scintillator block body for radiation detector, all of the divisions or scintillator chips of the joined scintillator block body have the same ability of light emission and, therefore, the radiation can always be detected at any portion on the photomultiplier tube under the sam conditions.

4 Claims, 2 Drawing Sheets

JOINED SCINTILLATOR BLOCK BODY FOR RADIATION DETECTOR

BACKGROUND OF THE INVENTION

The present invention relates to a joined scintillator block body for radiation detector used in radiologic diagnostic apparatus such as a positron emission tomography apparatus (e. g., positron computer tomography; positron CT).

The positron CT is an imaging apparatus for forming tomographic images of a subject to be examined by administering a radiation source capable of emitting positrons to the subject, detecting γ-rays emitted upon the extinction of the positrons with radiation detectors arranged around the subject in the form of a ring while rotating and scanning the detectors to obtain information from multiple directions and processing the information to give a tomographic image of the subject.

There has been used a detector which comprises a photomultiplier tube and a scintillator divided into a plurality of divisions, i. e., scintillator chips and connected to an entrance window of the photomultiplier tube, as such a radiation detector used in the positron CT. The γ-rays emitted from the radiation source in the subject to be examined is in order made incident upon the scintillator chips of the radiation detector, to thus cause emission of scintillation light rays. The scintillation light rays are photoelectrically converted into electric signals by the photomultiplier tube and the latter outputs the corresponding successive electrical signals. Thus, the finer each divided scintillation chip, the higher the space resolution of the resulting tomographic image.

An example of such scintillator is shown in FIG. 3 wherein a scintillator block 2 is provided with a plurality of deep grooves 5 arranged in constant intervals and the grooves are filled with a reflecting material 6. Thus the scintillator block 2 is divided into a plurality of scintillator chips $2_1$, $2_2$, .... In order to reduce the loss of radiation signals while making the most use of the photomultiplier tube 1, it is preferred to use the entire plane $1a$ of incidence of the photomultiplier tube 1. To this end, the entire plane $1a$ of incidence of the surface of the tube must be covered with a large scintillator block on the order of not less than 50 mm. However, it is impossible to obtain a single crystal for scintillator having such a large size from the technical standpoint. For this reason, there has been used a joined scintillator block body 25 which comprises a plurality of scintillator blocks joined to one another through layers of a reflecting material, for instance, a scintillator block 2 divided into a plurality of scintillator chips $2_1$. $2_2$.... and a scintillator block 3 likewise divided into a plurality of small scintillator chips $3_1$, $3_2$, ... are bonded together through layers of a reflecting material 6.

If such a joined scintillator block body 25 is employed, the γ-rays made incident upon the scintillator chip $2_3$ located in the middle of the scintillator block 2 cause the emission of scintillation light rays, the maximum quantity of light is made incident upon the portion on the photomultiplier tube 1 just under the scintillator chip $2_3$. while attenuated light rays are made incident upon other portions on the photomultiplier tube 1 below the scintillation chips $2_2$ and $2_4$ approximately symmetrically with respect to the portion just behind the chip $2_3$ and the tube 1 outputs detected signals in proportion to the dose of the γ-rays. On the other hand, γ-rays made incident upon the scintillator chip $2_1$ adjacent to the scintillator block 3 cause the emission of scintillation light rays which are made incident upon the portions on the photomultiplier tube 1 just below the scintillator chip $2_1$ and below the chip $2_2$, but are not made incident upon the portions on the tube just below the chip $3_1$ because the reflecting material 6 extends over entire joined interface between the scintillator blocks 2 and 3. For this reason, the quantity of positron-detection signal (photomultiplier counts) detected by the photomultiplier tube 1 is reduced at such joined portion. For instance, there is observed a portion at which the photomultiplier counts are low in the middle of the plane $1a$ of light incidence as shown in FIG. 4. This requires the incorporation of a corrective circuit into the detection circuit.

SUMMARY OF THE INVENTION

Accordingly, the object of the present invention is generally to solve the foregoing problems and more specifically to provide a joined scintillator block body for radiation detector which allows effective photoelectric conversion of scintillation light rays emitted due to incident radiation into electric signals and which can always detect radiation at any portion of the scintillator block under the same conditions.

The joined scintillator block body for radiation detector according to the present invention which has been developed to accomplish the foregoing object comprises a plurality of scintillator blocks, each being divided into small scintillator chips through deep grooves formed from the light incident side and filled with a reflecting material and these plurality of blocks being joined together, wherein a part of the interface between each neighboring two blocks is joined with the reflecting material and the remaining part thereof is joined with a transparent resin layer capable of transmitting scintillation light rays emitted by the chips.

The joined scintillator block body for radiation detector according to the present invention has a sufficient size with respect to the plane of light-incidence of a photomultiplier tube and accordingly the scintillation light rays emitted in response to incident radiation are efficiently photoelectrically converted into electric signals while making the most use of the plane of light-incidence of the photomultiplier tube. Moreover, all of the divisions of the joined scintillator block body have uniform ability of light radiation and, therefore, the radiation can always be detected at any portion on the photomultiplier tube under the same conditions.

DETAILED EXPLANATION OF THE INVENTION

The joined scintillator block body for radiation detector according to the present invention will hereinafter be explained in more detail while referring to FIG. 1.

Figure 1:
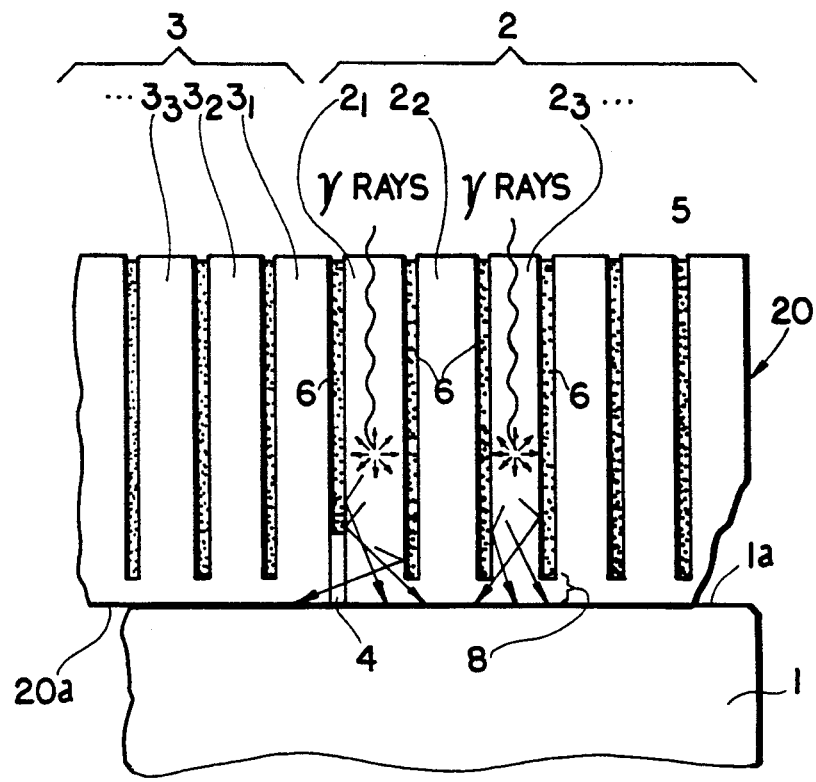
FIG. 1 is a side view of an embodiment of the joined scintillator block body for radiation detector according to the present invention.

As seen from FIG. 1, the joined scintillator block body 20 for radiation detector of the invention is a joined scintillator block body comprising a plurality of scintillator blocks 2 and 3 each being divided into a plurality of scintillator chips by cutting each block from the plane of radiation incidence to form grooves 5 and is connected to the entrance window 1a of a photomultiplier tube 1. The part of the interface between the scintillator blocks 2 and 3, which is adjacent to the photomultiplier tube 1 is joined through a transparent resin 4 capable of transmitting scintillation light rays therethrough.

For instance, $Bi_4Ge_3O_{12}$ crystals (hereinafter referred to as "BGO crystal(s)") are used as materials for the scintillator blocks 2 and 3.

The transparent resin 4 capable of transmitting scintillation light rays preferably has high adhesion to the scintillator block for ensuring the junction between the scintillator blocks 2 and 3 and a low absorption of scintillation light rays and is preferably a transparent silicone resin such as KE-42 available from Shin-Etsu Chemical Co., Ltd.

Incidentally, it is desirable that the area A of the part of the interface joined through the transparent resin 4 and present between the scintillator blocks 2 and 3 be equal to 1 to 3 times the area B of the portion 8 behind the groove which remains uncut ($1 < A/B < 3$). If scintillation light is, for instance, generated in the scintillator chip $2_1$ and the area A of the portion joined through the resin 4 is smaller than the area B of the uncut portion 8 ($A/B<1$), the quantity of the scintillation light emitted in the scintillator chip $2_1$ and transmitted to the chip $3_1$ is reduced and accordingly, the quantity of the light which outgoes from the bottom of the chip $3_1$ is also reduced. On the other hand, if the area A of the portion joined through the resin 4 exceeds 3 times the area B of the uncut portion (i. e., $A/B>3$), the relative area of the portion joined through the reflecting material 6 is reduced and the quantity of the scintillation light emitted in the chip $2_1$ and transmitted to the chip $3_1$ is correspondingly increased. This leads to the reduction in the quantity of light which outgoes from the bottom of the chip $2_1$ and is made incident upon the photomultiplier tube 1. Moreover, the scintillation light generated in the chip $2_1$ is not effectively separated from that generated in the chip $3_1$. This results in the reduction of the resolution of the radiation detector.

The reflecting material 6 may be, for instance, a tape of polytetrafluoroethylene (Teflon: trade name).

In the joined scintillator block body 20, scintillation light rays emitted in response to the radiation ($\gamma$-rays) incident upon the scintillator chip $2_3$ located in the middle of the scintillator block 2 is made incident upon the portion on the photomultiplier tube 1 just behind the chip $2_3$, while a part of the scintillation light rays transmitted through the uncut portions 8 are made incident upon the portions on the photomultiplier tub 1 just below neighboring two chips approximately symmetrically with respect to the portion of the tube just below the chip $2_3$ and the tube 1 outputs detected signals in proportion to the dose of the $\gamma$-rays. On the other hand, $\gamma$-rays incident upon the scintillator chip $2_1$ adjacent to the scintillator block 3 cause emission of scintillation light rays which are repeatedly reflected by the reflecting material 6 and principally made incident upon the portion on the photomultiplier tube 1 just below the scintillator chip $2_1$. In addition, a part thereof is transmitted to the neighboring chip $2_2$ through the uncut portion 8 and made incident upon the portion on the tube 1 behind the chip $2_2$, further remaining part thereof is transmitted to the neighboring chip $3_1$ through the transparent resin layer 4 as in the case of the uncut portion 8 and made incident upon the tube 1 behind the chip $3_1$. For this reason, the scintillation light generated in the chip $2_1$ is made incident upon the photomultiplier tube 1 such that the light extends over the portion on the photomultiplier tube just behind the scintillator chips $2_2$ and $3_1$ approximately symmetrically with respect to the portion on the tube just below the chip $2_1$.

As has been explained above, every scintillator chips $2_1$, $2_2$,...., $3_1$, $3_2$, .... can output scintillation light rays to the photomultiplier tube 1 under the same conditions.

The present invention will now be explained with reference to the following specific examples.

EXAMPLE 1

A block having a size of $30 \times 10 \times 25$ mm was cut out from a BGO crystal with an ID saw slicing machine and all of the faces thereof were subjected to lapping with green carbon of GC#600. The 5 faces thereof other than one of the faces having a size of $30 \times 10$ mm were mirror-finished with colloidal silica as an abrasive. The crystal block was cut from the side of the roughened surface of $30 \times 10$ mm with a multi-band saw slicing machine to form five grooves 5 having a width of 0.35 mm and a depth of 23.5 mm in intervals of 5 mm. Then a Teflon tape having a thickness of 0.3 mm was inserted into each groove 5 as a reflecting material 6 and the tape was fixed to the walls of the groove with a cyanamide type adhesive (Aron Alpha, available from Toagosei Chemical Industry Co., Ltd.) to give a scintillator block 2 provided with a plurality of scintillator chips $2_1$, $2_2$ .... In this respect the area of the uncut portion was $10 \times 1.5$ mm. Separately, a scintillator block 3 provided with a plurality of scintillator chips $3_1$, $3_2$,.... was likewise prepared in the same manner used above.

The scintillator blocks 2 and 3 thus prepared were joined at the faces of $10 \times 25$ mm by joining the part of the faces of $10 \times 1.5$ mm on the side of the light-outgoing plane 20a with a transparent resin 4, i.e., a transparent silicone resin composition (KE-42 available from Shin-Etsu Chemical Co., Ltd.) and the remaining area of the faces with a cyanamide type adhesive through a Teflon tape (reflecting material 6) to thus give a scintillator block joined body 20 comprising the scintillator blocks 2 and 3 as shown in FIG. 1.

EXAMPLE 2

The same procedures used in Example 1 were repeated except that the area (equal to $10 \times 3$ mm) of the faces on the side of the light-outgoing plane 20a was joined with the same transparent resin 4 and the remaining area thereof was joined with the cyanamide type adhesive through a Teflon tape (reflecting material 6) to thus give a joined scintillator block body 20.

EXAMPLE 3

The same procedures used in Example 1 were repeated except that the area (equal to $10 \times 5$ mm) of $10 \times 25$ mm the faces on the side of the light-outgoing plane 20a was joined with the same transparent resin 4 and the remaining area thereof was joined with the cyanamide type adhesive through a Teflon tape (reflecting material 6) to thus give a joined scintillator block body 20.

COMPARATIVE EXAMPLE 1

Figure 3:
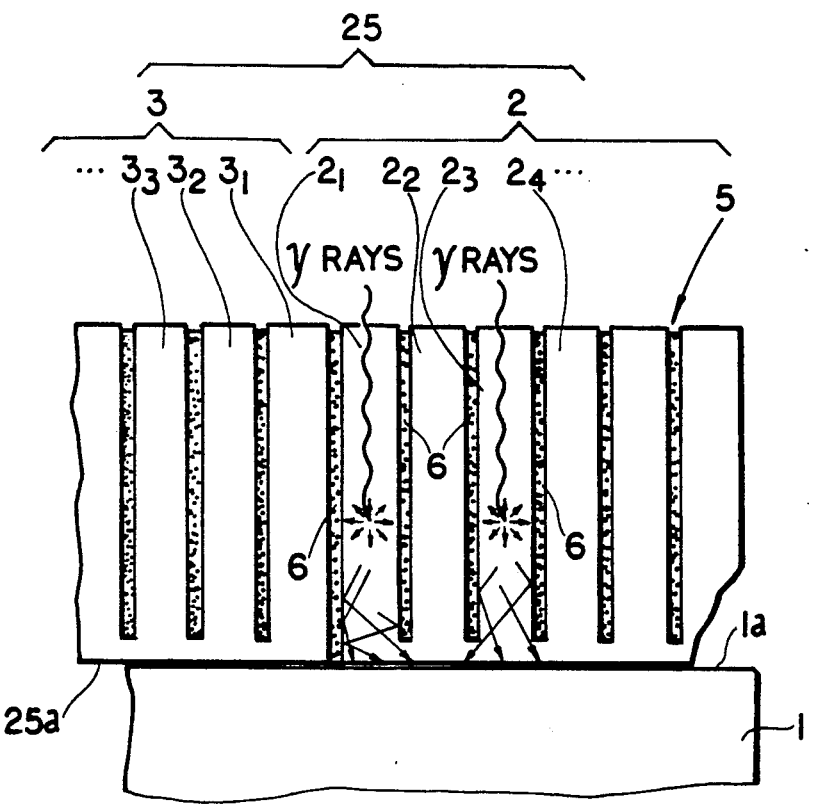
FIG. 3 is a side view of a conventional joined scintillator block body for radiation detector.

The same procedures used in Example 1 were repeated except that the entire area of the 10×25 mm faces of the scintillator blocks 2 and 3 was joined with the cyanamide type adhesive through a Teflon tape (reflecting material 6) to thus give a conventional joined scintillator block body 25 as shown in FIG. 3.

Each 30×10 mm mirror-finished face of the joined scintillator block bodies 20 obtained in Examples 1 to 3 and the joined scintillator block body 25 obtained in Comparative Example 1 was joined to photomultiplier tube 1 with a silicone oil to give a radiation detector. Each joined scintillator block body of the resulting radiation detector was irradiated with a predetermined dose of γ-rays to determine the quantity of each position-detection signal corresponding to the scintillator chip $2_1$. $2_2$. ..., $3_1$. $3_2$. ....

Figure 2:
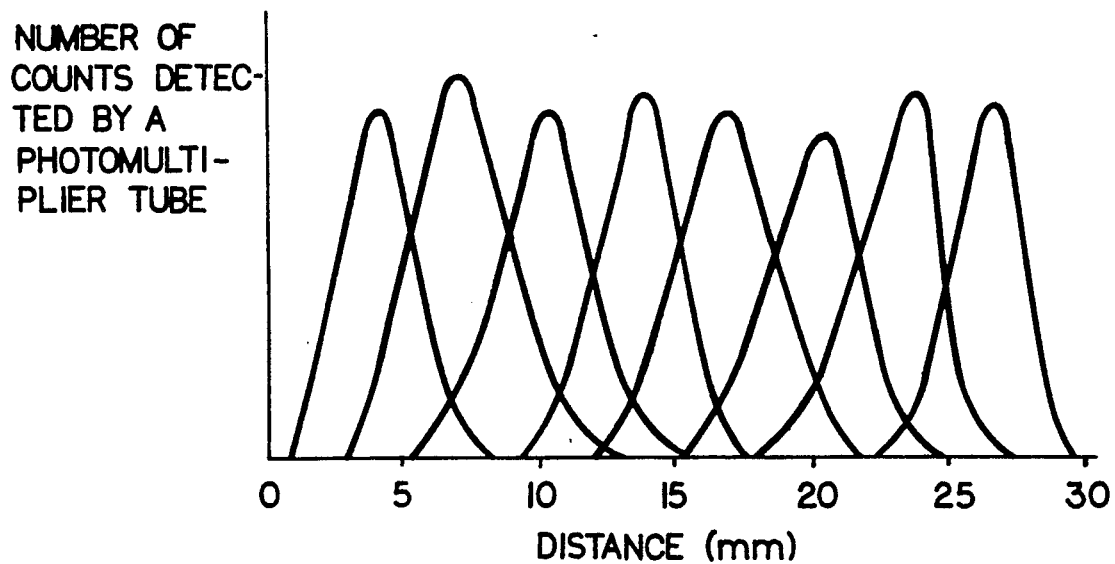
FIG. 2 is a graph showing the results of position-detection signal determination performed by the joined scintillator block body for radiation detector according to the present invention.

As a result shown in FIG. 2, the quantities (number of counts detected by the photomultiplier tube) of position-detecting signals which was good and uniform over the whole plane 1a of incidence of the photomultiplier tube was detected by the photomultiplier tubes 1 of the radiation detector provided with the joined scintillator block cemented bodies 20 obtained in Examples 1 and 2 (the areas joined with the resin 4 at the joined faces were 10×1.5 mm and 10×3 mm respectively). On the other hand, the quantity of position-detection signals in which that observed at the center of the plane 1a of light-incidence was not more than 80% that of the other area was detected by the photomultiplier tube 1 of the radiation detector provided with the scintillator block cemented body 20 (the areas joined with the resin 4 at the joined faces were 0×5 mm). This is because the size of the area joined through the Teflon tape (reflecting material 6) is reduced. This fact clearly indicates that the area of the face joined with the resin 4 should be less than 3 times that of the uncut portion 8 which is 10×1.5 mm in this case.

Figure 4:
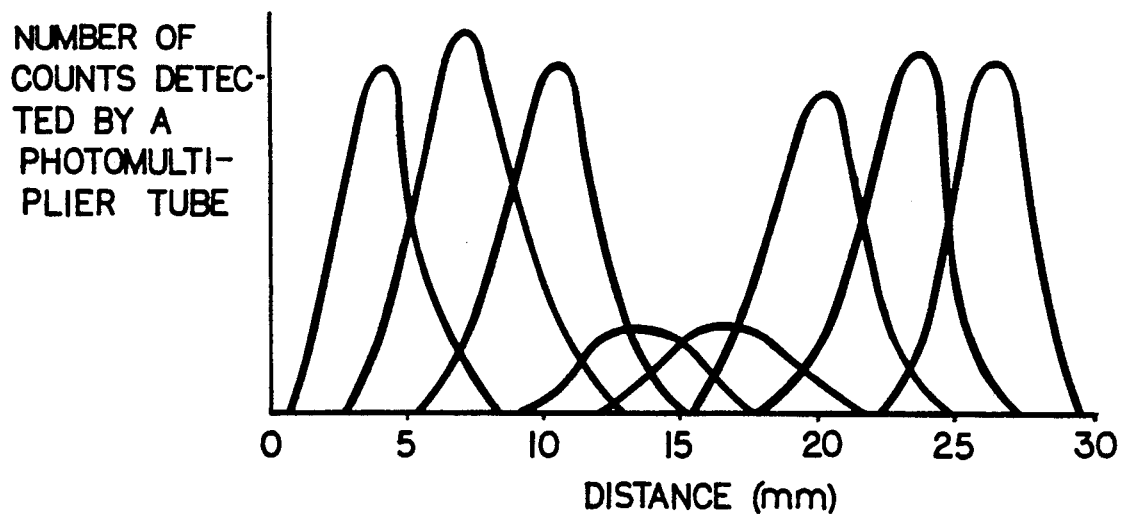
FIG. 4 is a graph showing the results of position-detection signal determination carried out using the conventional scintillator block cemented body for radiation detector.

As shown in FIG. 4, the quantity (number of counts detected by the photomultiplier tube) of position-detection signals in which that observed at the center of the plane 1a of light-incidence was extremely lower than those observed for both side thereof was detected by the photomultiplier tube 1 of the radiation detector provided with the joined scintillator block body 25 obtained in Comparative Example 1 (conventional one).

It should also be understood that the foregoing relates to only the scope of the invention is defined by the appended claims rather than by the description preceding them, and all changes that fall within meets and bounds of the claims, or equivalence of such meets and bounds are therefore intended to embraced by the claims.

What is claimed is:

1. A joined scintillator block body for radiation detector which comprises a plurality of scintillator blocks, each being divided into small scintillator chips through deep grooves formed by cutting each block from the light incident side and filled with a reflecting material and these plurality of blocks being joined together, wherein a part of the joined faces of each neighboring two blocks is joined with the reflecting material and the remaining portion thereof is joined with a transparent resin capable of transmitting scintillation light rays emitted by the scintillator chips.

2. The joined scintillator block body for radiation detector of claim 1 wherein the scintillator block is a crystal of $Bi_4Ge_3O_{12}$.

3. The joined scintillator block body for radiation detector of claim 1 wherein the transparent resin capable of transmitting the scintillation light rays is a silicone resin.

4. The joined scintillator block body for radiation detector of claim 1 wherein the ratio of the area A of each neighboring two scintillator blocks joined with the transparent resin to the area B of the uncut portion below the groove: A/B satisfies the relation: $1 < A/B < 3$.

* * * * *